United States Patent [19]

Jaeger

[11] 4,409,610
[45] Oct. 11, 1983

[54] METHOD FOR REPRODUCING POLYCHROME IMAGES

[75] Inventor: Walter Jaeger, Cureglia, Switzerland

[73] Assignee: GX-Holding AG, Basel, Switzerland

[21] Appl. No.: 210,353

[22] Filed: Nov. 25, 1980

[30] Foreign Application Priority Data

Nov. 29, 1979 [CH] Switzerland .................. 10614/79

[51] Int. Cl.³ .................................... H04N 9/34
[52] U.S. Cl. .................................................. 358/12
[58] Field of Search ................ 358/4, 11, 12, 14, 43, 358/334, 310

[56] References Cited

U.S. PATENT DOCUMENTS

| | | | |
|---|---|---|---|
| 3,255,303 | 6/1966 | Kihara | 358/4 |
| 3,479,450 | 11/1969 | McMann | 358/43 |
| 3,710,014 | 1/1973 | Justice | 358/12 |
| 3,739,079 | 6/1973 | Noda et al. | 358/43 |

*Primary Examiner*—John C. Martin
*Attorney, Agent, or Firm*—Oblon, Fisher, Spivak, McClelland & Maier

[57] ABSTRACT

A video signal sequence, corresponding to a chromatically double-sequential, nesting, interlace scan is used to obtain the simplest possible devices for the recording, transmission and/or storage of a color televison image. Two signals associated alternately line by line with different color separations, are used to this end. One of the signals also contains two signal components, which are associated in line portions with two different color separations. The video signal sequence is repeated line by line, half-frame by half-frame or frame by frame, prior to image reproduction and thus results in an image reproduction, from one and the same signal sequence, of good quality when using simple apparatus and of subjectively perfect quality when using more complex apparatus.

10 Claims, 5 Drawing Figures

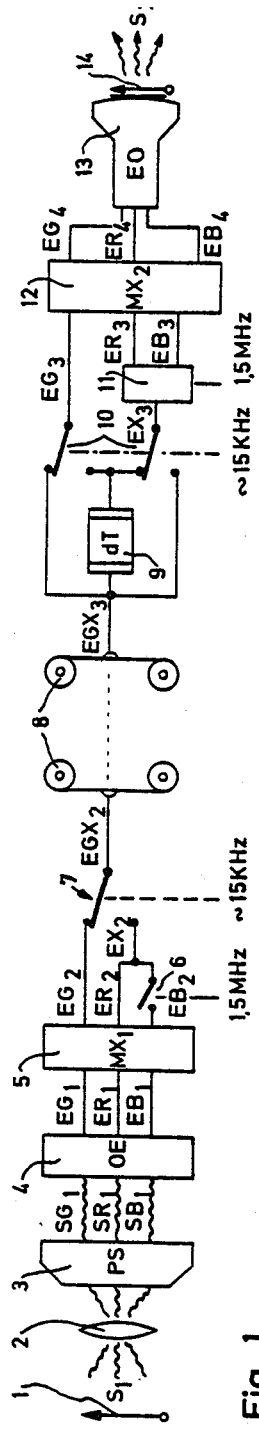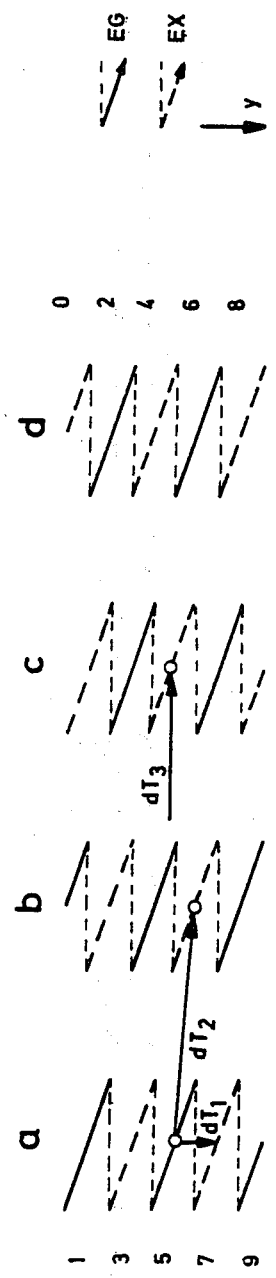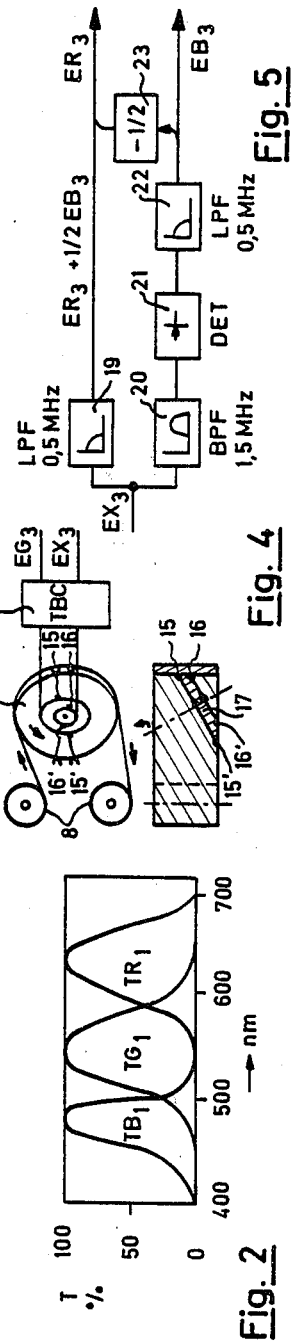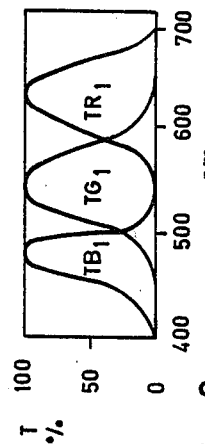

METHOD FOR REPRODUCING POLYCHROME IMAGES

BACKGROUND OF THE INVENTION

The invention relates to a method for reproducing polychrome moving images from an electric video signal sequence.

To reproduce multicoloured or polychrome moving images it is known to simultaneously employ three signal sequences. The simultaneous recording, storage and transmission of a plurality of signal sequences is known to cause substantial technological difficulties and calls for complex apparatus. It has therefore frequently been proposed for the signals required for good colour reproduction to be transmitted successively in time. To avoid flickering and colour distortion it is known to reproduce signals repeatedly. A repeated reproduction obtained through line by line repetition of the three signals required for good colour reproduction corresponds to an image reproduction with a substantially reduced vertical resolution and impaired focusing. Signal repetition with frame by frame repetition of the three signals produces a sharp image with conventional broadcast scanning systems but results in movements which appear to be jerky and causes horizontal drift. Moreover, the apparatus for image reproduction is too complex for domestic use.

SUMMARY OF THE INVENTION

It is the object of the present invention to provide a method which is free of the above-mentioned disadvantages. The method according to the invention generates a good image by sequential transmission of the video signals and therefore with simple recording, memory and transmission systems. Furthermore, a good image reproduction can be obtained from a very simple domestic system or an excellent image reproduction can be obtained from a studio system, which is still simple, using the same transmitted or stored signal sequence.

According to the invention, this problem is solved by the use of a video signal sequence which corresponds to a frame scan and a frame reproduction with a line raster and the line by line video signal sequence comprises alternately a first and a second signal of which the first signal, at least in portions of a line, corresponds to a first colour separation and that the second signal, in portions of a line and sequentially, corresponds to at least two different other colour separations of the image original, that at least the first signal is reproduced at least twice by repetition and that at least the second signal is divided into signal components associated with its colour separations and that the first signal as well as the signal components of the second signal are converted into image traces which luminesce in different colours.

To obtain a sharply focused image reproduction it is convenient that the first colour separation of a colour with a relative brightness reference value for body colours corresponds to the optimum colours on illumination with studio light of at least 50%.

To obtain a good image with full vertical resolution it is convenient to employ a video signal sequence which corresponds to a frame scan and a frame reproduction which is based on an interlace raster. To permit the use of a simple reproduction device it is convenient for the first signal to be successively repeated line by line with respect to time.

To obtain an image with good vertical resolution and with moderate expenditure for the reproduction device it is convenient if the first signal is successively repeated with respect to time in half-frame manner, by one half-frame scanning/period plus/minus a half line scanning period.

To obtain a quality which is compatible with broadcasting and is subjectively of broadcasting quality it is also convenient if the first signal is successively repeated, frame by frame with respect to time.

For many purposes it is convenient if the signal sequence is stored on a data medium, for example a magnetic tape.

To obtain a simple image reproduction device it is also convenient if the successive repetition with respect to time is generated by repeated scanning of the signal sequence which is stored on the data medium.

To obtain simple image signal recording it is also convenient if the different colour separations correspond sequentially and alternatively to a first colour having a first spectral light distribution and to a second colour, also containing the said first spectral light distribution and a second spectral light distribution.

To obtain simple division it is convenient if division into signal components is obtained by frequency selective means.

To avoid colour raster distortion it is also possible to advantageously repeat at least one component of the second signal in line portions.

BRIEF DESCRIPTION OF THE DRAWINGS

The invention will now be explained by reference to the accompanying drawing in which—

FIG. 1 is a diagrammatic view of a system for performing the method according to the invention.

FIG. 2 is a diagrammatic view of the optical colour distribution for the three colour separations employed.

FIG. 3 shows the line trace of image scanning and image reproduction.

FIG. 4 shows diagrammatically an image repetition device for doubled signal reproduction.

FIG. 5 shows the device for dividing a signal into two signal components.

DETAILED DESCRIPTION OF A PREFERRED EMBODIMENT

As can be seen by reference to FIG. 1, the light rays $S_1$ of the object 1 are divided by means of the lens 2 and the image splitter 3 into the light beam components $SG_1$, $SR_1$ and $SB_1$. The electro-optical transducer 4 produces three electrical signals $EG_1$, $ER_1$ and $EB_1$ by scanning the image of the object 1 and said signals correspond to the above-mentioned light beam components.

The sequentially transmitted and stored signals $EG_2$, $ER_2$ and $EB_2$ are formed by means of the matrix 5 from the above-mentioned electric signals. The signal $EX_2$ is formed from the two signals $ER_2$ and $EB_2$ by means of a switch 6 adapted to operate at a rate of 1.5 MHz and the video signal sequence $EGX_2$ is formed from the signal $EG_2$ and the signal $EX_2$ by means of the switch 7.

The changeover switch 7 operates at line frequency, i.e. approximately 15 kHz. This image signal sequence can be transmitted without encoding at radiofrequency or can be stored, for example as indicated in FIG. 1, on a magnetic tape 8.

To reproduce the transmitted video signal sequence $EGX_3$ the latter is doubled by the delay line 9 with the aid of the changeover switch 10. Changeover switching is performed in synchronism with the beginning of the line and therefore at a frequency of approximately 15 kHz so that the video signal sequence EGX$_3$ is divided into the signal frequencies EG$_3$ and EX$_3$. Accordingly, the delay is set by the delay line 9 to approximately 64 $\mu$s or on repetition to approximately 20 $\mu$s.

The signal sequence EX$_3$ is divided into its components ER$_3$ and EB$_3$ by means of the frequency-sensitive isolating circuit 11. By means of the matrix 12 the signals EG$_3$, ER$_3$ and EB$_3$ are converted into the control signals EG$_4$, ER$_4$ and EB$_4$ for the cathode ray tube 13 which operates with three colours. The cathode ray tube 13 functions as an opto-electric transducer and generates the image 14, corresponding to the object 1.

The image splitter 3 divides the light flux S$_1$ filtering into light fluxes SG$_1$, SR$_1$ and SB$_1$. FIG. 2 shows filter curves suited to this end.

By scanning the colour separations formed by the image divider 3, the opto-electrical transducer 4 generates the electric video signals EG$_1$, ER$_1$ and EB$_1$. Broadcast compatible scanning is obtained by means of interlace scanning. FIG. 3 shows in diagrammatic form the line tracing scheme for the first four fields a,b,c and d. Partial line changeover switching between ER and EB can be performed optically by the image splitter 3 or by means of a changeover switch 6 as indicated in FIG. 1.

FIG. 3 also shows that repetition of the line data after a line period dT$_1$ results in image reproduction with a homogeneous raster which is however produced from broadened lines. An image reproduction with image repetition after each half-frame designated as dT$_2$ in FIG. 3, also leads to a homogeneous raster and to an image reproduction with raster lines which are less broad than those obtained by line repetition. FIG. 3 also indicates that image repetition after a full image, indicated as dT$_3$ in FIG. 3, leads to an image reproduction without any broadened raster lines.

According to kinematographic experience, the last-mentioned case would lead to the expectation of a jerky reproduction of movement. Surprisingly, this effect does not occur despite a frame frequency of only 12.5 frames per second.

Repetition after one half-frame or more particularly after a full frame, calls for the storage of a large quantity of data over a period of 20 or 40 milliseconds respectively. FIG. 4 shows an exemplified arrangement with a magnetic tape memory for repetition in terms of half-frames or full frames. The trace shown in sloping lines is read by two heads 15 and 16 which are in contact with the magnetic tape 8. After a half rotation of the disc 17, which supports these heads, two different magnetic heads 15' and 16' come into contact with the magnetic tape 8. These four heads 15, 15' and 16, 16' are arranged on the disc 17 so that two of the heads 15 and 15' always scan the trace corresponding to the signal EG$_3$ of one half-frame or frame and the other two heads 16 and 16' scan the trace corresponding to the signal EGX$_3$ of the next half-frame or frame and vice versa. These signals are then applied to a switch (not shown) like switch 10 of FIG. 1 in order to recover signals EG$_3$ and EX$_3$.

Minor irregularities in time base reproduction are the result of mechanical inaccuracies and elasticity of the magnetic tape 8. Between two successive traces, these irregularities amount to only a fraction of a line period, but they can however be eliminated by a simple digital line-time compensating circuit 18.

Division of the signal EX$_3$ into its two components ER$_3$ and EB$_3$ by means of a frequency-selective circuit is shown in FIG. 5.

As can be seen by reference to FIG. 5, the signal ER$_3$+½ EB$_3$ is initially separated by means of a low-pass filter 19. The signal EB$_3$, modulated at 1.5 MHz, is filtered by means of a band pass filter 20. The signal EB$_3$ is formed by means of a detector 21 and a low-pass filter 22. The negative value of ½ EB$_3$ is formed in a reversing stage 23. This negative value is added to the signal ER$_3$+½ EB$_3$ to produce the signal ER$_3$.

What I claim:

1. Method for reproducing polychrome moving images from an electric video signal sequence, characterized by the use of a video signal sequence which corresponds to an image scan and image reproduction with a line raster and the line by line video signal sequence comprises alternately a first and a second signal of which the first signal, at least in portions of a line, corresponds to a first colour separation and that the second signal, in portions of a line and sequentially, corresponds to at least two different other colour separations of the image original, that at least the first signal is repeated at least once by repetition and delayed by at least one field period and that at least the second signal is divided into signal components associated with its colour separations and that the first signal as well as the signal components of the second signal are converted into luminous image traces of different colour.

2. Method according to claim 1, characterized in that the first signal is successively repeated with respect to time field by field over a field scanning period plus/minus a half line scanning period.

3. Method according to claim 1, characterized by the use of a video signal sequence which corresponds to one frame scan and one frame reproduction each having at least one interlace raster.

4. Method according to claim 3, characterized in that the first signal is successively repeated field by field over a field scanning period plus/minus a half line scanning period.

5. Method according to claim 3, characterized in that the first signal is successively repeated in field manner.

6. Method according to claims 1, 2, 3, 4 or 5, characterized by the use of a signal sequence which is stored on a data medium.

7. Method according to claim 6, characterized in that the repetition is generated by repeated scanning of the signal sequence which is stored on the data medium.

8. Method according to claims 1, 2, 3, 4 or 5, characterized in that two different colour separations of the second signal sequentially and alternately correspond to a first colour, having a first spectral light distribution and to a second colour which also contains the said first spectral light distribution and a second spectral light distribution.

9. Method according to claim 1, characterized in that division into signal components is performed by frequency selective means.

10. Method according to claim 1, characterized in that at least one component of the second signal is repeatedly reproduced.

* * * * *